(No Model.)

N. OLSEN.
WAGON AXLE.

No. 479,918. Patented Aug. 2, 1892.

Witnesses:
W. F. Bruckner
E. Hnvrtty

Inventor,
Neil Olsen
By G. Geisler
his Attorney.

UNITED STATES PATENT OFFICE.

NEIL OLSEN, OF PORTLAND, OREGON.

WAGON-AXLE.

SPECIFICATION forming part of Letters Patent No. 479,918, dated August 2, 1892.

Application filed February 20, 1892. Serial No. 422,326. (No model.)

*To all whom it may concern:*

Be it known that I, NEIL OLSEN, a citizen of the United States, residing at Portland, Multnomah county, and State of Oregon, have invented a new and useful Improvement in Axles for Vehicles, of which the following is a specification, reference being had to the accompanying drawings as a part hereof.

The object of my invention is to provide vehicles with axles and bearings therefor of simple construction which will distribute the weight or strain on the bearing parts, and the said axle-bearings being adapted to retain the lubricant and exclude dust and grit as much as possible, all of which improvements are conducive to durability.

Figure 1:
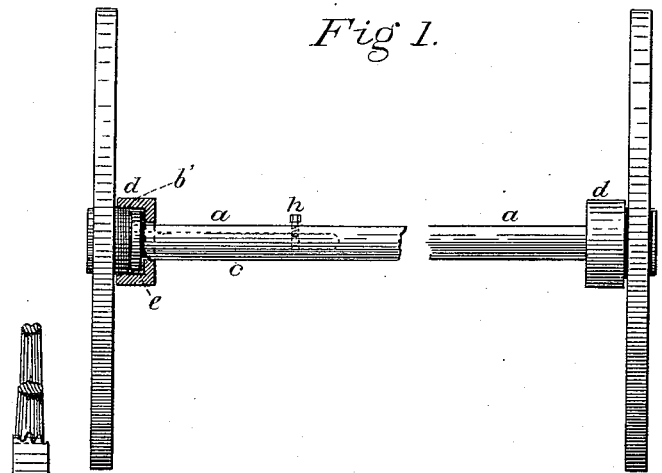
Figure 2:
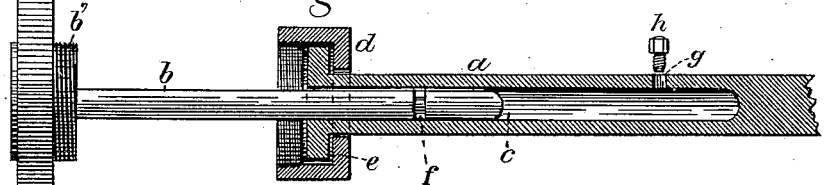
Figure 3:
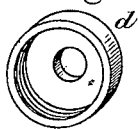

In the drawings, Figure 1 is an end elevation with parts of the axle-tree broken away. Fig. 2 is a partial end elevation of a wheel, showing its fixed axle-sections and bearings therefor in a longitudinal vertical section; and Fig. 3 is a detail.

Like letters refer to like parts throughout the several views.

In constructing my invention I provide my axle-trees with tubular recesses or sockets $c$, designed to receive axle-sections $b$. The latter are fast in their respective wheels and rotate with them. The periphery of the interior end $b'$ of the hubs of said wheels is threaded to receive a cap $d$, provided with a threaded interior periphery and adapted to secure the wheels and their axle-sections in place. Said caps $d$ are placed on the tubular sockets of the axle-trees and then a butting flange or collar $e$ welded or otherwise fixed on the outer ends of said tubular sockets to retain said caps, which caps upon being secured to the hubs of the wheels form with such hubs annular chambers for the said collars $e$, holding the wheels in place to revolve in. The axle-sections of the respective wheels may each be further provided with an annular groove $f$ and the tubular sockets threaded holes $g$, in which to screw a set-screw $h$ for the purpose of furnishing additional means for securing said wheels in place. Said screw-holes $g$ may also be used for introducing a lubricant into said tubular sockets, the set-screw $h$ in that case being temporarily withdrawn.

Having thus described my invention, now what I claim, and desire to secure by Letters Patent, is—

1. The combination, in vehicles, of a suitable axle-tree or axle-trees provided with tubular recesses or sockets in which to receive the axle-sections of the respective wheels, said tubular sockets being provided with fixed butting-collars $e$ and caps $d$, adapted to be secured on the hubs of the wheels, and wheels having fixed axle-sections $b$ for revolving in said tubular sockets, the hubs $b'$ of which wheels are adapted to abut against said collars $e$ and to be held in place by said caps $d$, substantially as set forth.

2. The combination, in vehicles, of a suitable axle-tree or axle-trees provided with tubular recesses or sockets in which to receive the axle-sections of the respective wheels, said tubular sockets being provided with fixed butting-collars $e$ and set-screws $h$ and caps $d$, adapted to the purposes specified, and wheels having fixed axle-sections $b$ for revolving in said tubular sockets, the hubs $b'$ of which wheels are adapted to abut against said collars $e$ and to be held in place by said caps and said axle-sections being also provided with annular grooves $f$, in which to receive the set-screws $h$ as additional means for holding the wheels in place, all substantially as described.

NEIL OLSEN.

Witnesses:
T. J. GEISLER,
W. B. AMES.